United States Patent

[11] 3,631,441

| [72] | Inventor | Herman H. Murphy<br>3870 Highland Ave., San Diego, Calif. 92105 |
|---|---|---|
| [21] | Appl. No. | 795,439 |
| [22] | Filed | Jan. 31, 1969 |
| [45] | Patented | Dec. 28, 1971 |

[54] LAMP FAILURE INDICATOR
2 Claims, 9 Drawing Figs.

[52] U.S. Cl. .................................................. 340/251,
315/83, 340/52 R
[51] Int. Cl. ..................................................... G08b 21/00,
B60q 1/04
[50] Field of Search ........................................... 340/251,
52, 331; 317/132, 157; 315/82, 83

[56] References Cited
UNITED STATES PATENTS

| 1,580,313 | 4/1926 | McIntire ..................... | 340/251 |
| 2,087,029 | 7/1937 | Gordon ....................... | 340/251 UX |
| 2,171,152 | 8/1939 | Very ........................... | 340/251 |
| 2,915,681 | 12/1959 | Troy ........................... | 317/123 |
| 1,972,514 | 9/1934 | Engelhard et al. ............ | 340/251 UX |
| 2,110,221 | 3/1938 | Hamilton ..................... | 340/251 UX |

FOREIGN PATENTS

| 427,409 | 4/1935 | Great Britain ................ | 340/251 |
| 442,107 | 2/1936 | Great Britain ................ | 340/251 |
| 737,480 | 9/1955 | Great Britain ................ | 340/251 |

*Primary Examiner*—John W. Caldwell
*Assistant Examiner*—Daniel Myer
*Attorney*—Hinderstein & Silber ABSTRACT: A circuit arrangement for monitoring the normal operation of the headlamp filaments in an automotive vehicle comprising an interrupter device connected in an electrical circuit with the headlamp filaments and a power supply, the interrupter device being inhibited from functioning as an active interrupter by a normally functioning filament. Upon failure or other abnormality in the headlamp circuit, the device is enabled to function as an active interrupter to produce an audible indication characteristic of a buzzer or horn and, optionally, to provide a visual indication of the failure to the driver. According to the preferred embodiment of the invention, when functioning as an active interrupter, the present device intermittently connects an alternate filament into the circuit to substitute for the failed filament to thereby visually signal distant observers of the failure.

Patented Dec. 28, 1971

INVENTOR.
HERMAN H. MURPHY

BY

ATTORNEYS

Patented Dec. 28, 1971

INVENTOR.
HERMAN H. MURPHY

BY

ATTORNEYS

LAMP FAILURE INDICATOR

BACKGROUND OF THE INVENTION

1. Field of the Invention

The present invention relates to circuitry for monitoring critical electrical circuit elements and, more particularly, to a thermally or electromagnetically actuated interrupter device for monitoring electrical circuit elements such as the headlamps of an automotive vehicle, for detecting an element failure, for audibly indicating the failure, and for providing a visual indication of the failure to distant observers.

2. Description of the Prior Art

The headlamps of an automobile serve two primary functions. In the first instance, they provide light so that the vehicle driver can see his path of travel. Simultaneously, the headlamps define the two sides and position of the vehicle for a distant observer such as a pedestrian or oncoming vehicle driver. Because of the importance of both of these features, when such a headlamp filament fails, serious safety problems arise.

The life expectancy of a standard, sealed-beam, headlamp filament, as used in automotive vehicles, is normally in the range of from 200 to 300 hours. In addition to the normal life expectancy, headlamp filaments are subject to premature failure due to several causes including air leakage and filament breakage due to vibration and road shocks. The primary safety problem presented by a headlamp failure arises from the inability of the headlamps to perform the second function in that pedestrians and drivers of oncoming vehicles, especially on undivided roadways, are frequently unable at night and under other conditions of reduced visibility to perceive correctly the size and lateral and longitudinal position on the road of a vehicle with one inoperative headlamp. Furthermore, since the remaining head lamp usually provides sufficient light for the vehicle driver to see his path of travel, a complicating factor resides in the fact that the headlamp failure is usually not immediately apparent to the vehicle driver. As a result, a lengthy period of time often passes before the headlamp failure can be corrected.

To solve this problem, it has been suggested to incorporate, on all motor vehicles, a reserve, front lighting system which would be operative in the event of a failure of a primary headlamp filament. However, while the provision of a reserve lighting system would be significant, it is apparent that such a system alone would provide only an incomplete solution to the overall problem. In other words, with a reserve, front lighting system alone, the driver of the vehicle would still not be aware of the fact that his primary system had failed. In fact, the presence of a reserve system would only serve to substantiate the driver's belief that his headlamps were operating properly. The result would be the continued use of the reserve lighting system until it too failed.

Since the greatest problem contributing to the safety hazard resides in the fact that the driver is often unaware of an existing failure of a headlamp, the only solution which fully alleviates the hazard is the provision of a lamp failure indicating system which would operate to immediately detect and distinctly warn the driver in the event of a headlamp failure so that correction could be accomplished at the earliest moment. With such a device, the time duration of the hazard would be minimized, thus reducing the number of pedestrians and oncoming drivers which might otherwise be subjected to the hazard. A reserve lighting system, on the other hand, would provide significant secondary benefits in that it would provide a temporary emergency substitute for the failed headlamp only during the minimal time period existing between detection of the lamp failure and the subsequent replacement of the failed headlamp.

Several such lamp failure indicating systems have been proposed in the past. However, none of these systems have come into use for several reasons. In the first instance, most prior art detection systems have been far too expensive to be practical. In addition, many of the proposed systems have been too complex and/or subject to malfunction. Finally, most prior art systems have not been easily adaptable to conventional existing headlamp electrical systems, thereby presenting serious installation problems.

SUMMARY OF THE INVENTION

According to the present invention, these problems are completely solved by the provision of a novel system for continually monitoring the normal operation of all headlamp filaments selected for use, for immediately detecting the failure or abnormal operation of any of the selected headlamp filaments, and for immediately warning the driver of the abnormal filament operation by a distinctive audible indication and, optionally, by a visual indication. In addition, and in accordance with one embodiment of the present invention, the present lamp failure indicating system operates to automatically and intermittently connect a substitute, alternate or reserve filament, positioned adjacent the defective filament, for the defective filament so as to visually indicate, in a distinctive manner, to pedestrians and oncoming drivers that a specific headlamp unit is defective. Since the present invention monitors the normal operation of the entire headlamp electrical system, it will also warn of a potential hazard caused by a low voltage battery. The present device is both simple and reliable and may be economically manufactured and included in a new vehicle headlamp system or easily adapted to conventional, existing headlamp electrical systems at a reasonable cost to the consumer.

Briefly, the present invention comprises a thermally or electromagnetically actuated interrupter device connected in circuit with a power source and loaded circuit for monitoring the current through the load circuit for normal operation. The interrupter device is inhibited from functioning as an active interrupter by a normally functioning load circuit. However, upon failure of the load circuit element, the device is enabled to function as an active interrupter to produce an audible indication characteristic of a buzzer or horn and, optionally, to provide a visual indication to the driver. Furthermore, when functioning as an active interrupter, the present device intermittently connects an alternate or reserve filament into the circuit so as to substitute for the failed load circuit element to visually signal distant observers of the primary load circuit failure.

It is, therefore, an object of the present invention to provide novel circuitry for monitoring critical electrical circuit elements.

It is a further object of the present invention to provide a thermally or electromagnetically actuated interrupter device for monitoring electrical circuit elements such as the headlamps of an automotive vehicle.

It is a still further object of the present invention to provide a system for continually monitoring the normal operation of all headlamp filaments selected for use, for immediately detecting the failure or abnormal operation of any of the selected headlamp filaments, and for immediately warning the driver of the abnormal filament operation by a distinctive audible indication.

It is another object of the present invention to provide circuitry for monitoring the normal operation of headlamp filaments which will automatically and intermittently connect a substitute nearby or reserve filament for the defective filament to visually indicate to distant observers that a specific headlamp unit is defective.

It is still another object of the present invention to provide circuitry for monitoring the normal operation of an automotive vehicle's headlamps in which distant observers are signalled of the presence of a failure with a substitute filament having a distinctive color different than normal headlamp colors.

Another object of the present invention is the provision of a simple and reliable circuit for monitoring the normal operation of the headlamps of an automotive vehicle and for indicating the presence of an abnormal condition.

Still another object of the present invention is the provision of a circuit for monitoring the normal operation of the headlamps of an automotive vehicle which may be economically manufactured and included in a new vehicle headlamp system or easily adapted to conventional existing headlamp electrical systems at a reasonable cost to the consumer.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

Figure 1:
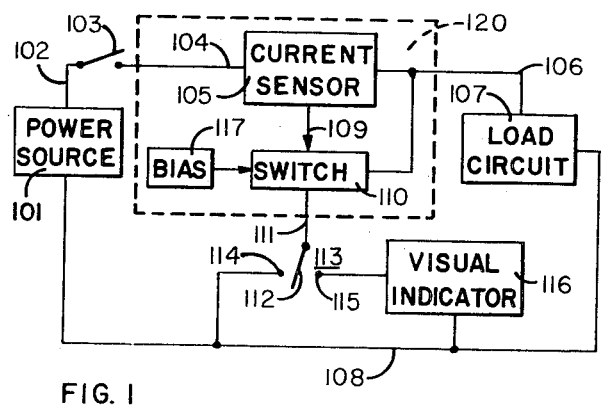
FIG. 1 illustrates, in block diagram form, the most basic form of circuit element failure indicator constructed in accordance with the teachings of the present invention.

Current sensor 105 may be any one of several types of devices, to be described more fully hereinafter, which is operative to sense the current flowing from line 104 to line 106 and to electrically, electromechanically, thermally, electromagnetically or mechanically operate switch 110 to either open or close the connection therethrough from line 106 to 111. In a typical situation, switch 110 is normally biased in the closed position by a bias means 117 to provide an electrical connection between line 106 and line 111.

In operation, when power switch 103 is closed, current from power source 101 flows through a first path consisting of lines 102, 104, 106 and 108, switch 103, current sensor 105 and load circuit 107 back to power source 101. Current also flows from power source 101 through a second path consisting of lines 102, 104 and 106, switch 103, current sensor 105 and switch 110 into line 111. Assuming for the moment that arm 112 of switch 113 is in contact with terminal 114, the current in line 111 flows into line 108 and back to power source 101. Bias means 117 is adjusted so that this current flowing through current sensor 105 and switch 110 causes current sensor 105 to actuate switch 110 against the force of bias means 117 to open the path between lines 106 and 111. Once the second path is open, the current of the first path then establishes a normal current through load circuit 107 so that current sensor 105 sustains switch 110 in an open circuit condition. Therefore, during normal operation of load circuit 107, switch 110 is open and there is only a flow of current through the first path including load circuit 107.

In the event that load circuit 107 should fail, thereby causing the current in load circuit 107 to decrease, the current through current sensor 105 will also decrease. Bias 117, current sensor 105 and switch 110 are such that a less-than-normal current through load circuit 107 is insufficient for current sensor 105 to maintain switch 110 in the open position, whereupon switch 110 is actuated to close the circuit from line 106 to 111. When this occurs, the current now flowing through current sensor 105 and switch 110 is sufficient to cause current sensor 105 to again actuate switch 110 to open the circuit between lines 106 and 111. However, since the load circuit current is now less than normal, switch 110 immediately closes to repeat the cycle. Therefore, when the current through load circuit 107 is insufficient for current sensor 105 to maintain switch 110 in the open position opposition to the bias thereupon from bias means 117, switch 110 is continually reactuated from the open to the closed position and back again, thereby providing a periodically recurring cycle of operation typical of an interrupter unit such as a lamp flasher. Furthermore, switch 110 is of such a nature that as it is actuated alternately between the open and closed positions, an audible sound is produced. Thus, current sensor 105, switch 110 and bias means 117 cooperate to form a monitoring unit 120 which detects a subnormal current through current sensor 105 and which indicates the subnormal current condition by functioning as an interrupter unit to produce an audible indication. On the other hand, a normal current through load circuit 107 inhibits current sensor 105 and switch 110 from operating as an interrupter unit.

With arm 112 of switch 113 in contact with terminal 114, monitor unit 120 provides only an audible indication of a failure in load circuit 107. With arm 112 in contact with terminal 115, a supplementary visual indication, such as a substitute load circuit or a warning light may be employed to provide a visual indication of a failure in load circuit 107. When used, visual indicator 116 indicates a load circuit failure by intermittently flashing on and off as switch 110 opens and closes.

It will also be apparent to those skilled in the art that monitor unit 120, by operating to sense a less-than-normal current through current sensor 105, will also indicate a decrease in power from source 101. In other words, if power source 101 should partially fail and produce a less-than-normal output potential thereby providing a subnormal current to load circuit 107, this condition is sensed by monitor unit 120 and signalled by typical interrupter action in the same manner as monitor unit 120 indicates a failure in load circuit 107.

The remaining figures of drawing disclose specific embodiments of the generalized circuit shown in FIG. 1. Furthermore, the specific embodiments of monitoring units disclosed hereinafter will be described in connection with electrical lighting systems involving functional requirements for safety, such as the headlamps, tail and stop lights of automotive vehicles, since such is the preferred use for the present invention. However, it will be apparent to those skilled in the art that the teachings of the present invention are equally applicable to other circuits in which the current from a power source to a load is to be monitored.

Figure 2:
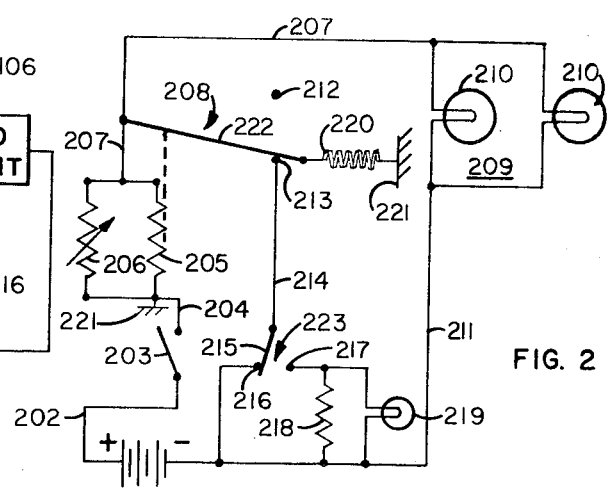
FIG. 2 is a circuit diagram of a first specific embodiment of monitoring unit which employs an electrothermal current sensor element.

Referring now to FIG. 2, the first specific embodiment of monitoring unit embodying the features of FIG. 1 comprises a battery 201, one terminal of which is connected via a line 202 to one terminal of a power switch 203, the other terminal of which is connected via a line 204 to one terminal of a current sensor 205. Current sensor 205 may be a thermally responsive element of the type employing a resistive heating element, whereby an electrical current passing through the heating element results in a physical movement due to thermal expansion. One end of current sensor 205, adjacent the one terminal thereof, is anchored to a fixed support 221, while the other end thereof is movable in response to a current flow therethrough. A shunting resistor 206, which may be adjustable, may be connected in parallel with current sensor 205 to provide a partial bypass path for a proportional part of the electrical current flowing from battery 201 through current sensor 205.

The other terminal of current sensor 205, adjacent the other end thereof, is connected via a line 207 to the arm 222 of a load circuit shunting switch 208 and to one terminal of a load circuit 209 which may consist of one or more electrical load elements such as the primary lamp filaments 210 of an automotive vehicle which are to be monitored for operation. The other terminal of load circuit 209 is connected via a line 211 to the other terminal of battery 201 to complete an electrical circuit.

Shunting switch 208 includes first and second terminals 212 and 213, the former not being connected to any other circuit components, and the latter being connected via a line 214 to the arm 215 of a switch 223 having first and second terminals 216 and 217. Terminal 216 is connected directly to line 211 whereas terminal 217 is connected to line 211 via a resistor 218 and a secondary filament or warning indicator 219.

Load circuit shunting switch 208 has a spring bias means 220 which may be an integral part of arm 222 of shunting switch 208 and which is connected between arm 222 and fixed support 221. Spring bias 220 is preferably formed in a manner to provide a rapid snapping action and an audible indication when flexed. Flexure of spring bias means 220 occurs during a change in position of arm 222 of shunting switch 208 which is mechanically coupled to the movable other end of current sensor 205. Furthermore, a flow of electrical current through current sensor 205 causes actuation of switch 208 because of the thermally induced expansion and contraction of the movable end of sensor 205. In other words, when an electrical current passes through current sensor 205, a thermal expansion force is developed and the movable end thereof is moved away from the anchored first end thereof. The movable end of current sensor 205, being mechanically coupled to arm 222 of shunting switch 208, changes the position of arm 222, in opposition to spring bias means 220, from terminal 213 to terminal 212. On the other hand, when the electrical current through current sensor 205 is removed or decreased below a specific level, spring bias means 220 returns shunting switch 208 to the first position in contact with terminal 213.

In operation, when power switch 203 is closed, current from battery 201 flows through lines 202 and 204, switch 203 and current sensor 205 to arm 222 of shunting switch 208, where the current is distributed into two paths. In the first path, a current flows through arm 222, terminal 213, line 214, arm 215 of indicator selector switch 223 and either contact 216 or contact 217 to line 211 for return to battery 201. In the second path, a current flows through line 207, load circuit 209 and line 211 back to battery 201. As in FIG. 1, the current in the first path, flowing through current sensor 205, initially actuates shunting switch 208 to the open position with arm 222 contacting terminal 212 in opposition to spring bias 220. The current in the second path, also flowing through current sensor 205 and load circuit 209, then establishes a normal current which is utilized to sustain shunting switch 208 in the open position. On the other hand, and in the event that one or more of the primary lamp filaments 210 should fail, the current in load circuit 209 will decrease, thereby reducing the current flowing through current sensor 205. Spring bias 220 is adjusted so that this subnormal current is insufficient for current sensor 205 to sustain shunting switch 208 in the open position whereupon arm 222 moves to the closed position in contact with terminal 213. When this occurs, the first path for current flow is reestablished and switch 208 is actuated from the closed position to the open position. However, when this occurs, since the load circuit current is below normal, shunting switch 208 immediately returns to the closed position and the cycle repeats. Therefore, as in FIG. 1, when the current of load circuit 209 is insufficient for current sensor 205 to maintain shunting switch 208 in the open position in opposition to spring bias means 220, shunting switch 208 continuously and periodically opens and closes, thereby providing a recurring cycle of operation typical of an interrupter unit. Furthermore, as shunting switch 208 is alternately actuated, a sound is produced through the flexing of spring bias 220. Thus, current sensor 205, shunting switch 208 and spring bias means 220 cooperate to form a monitor device which detects a subnormal current through current sensor 205 and which indicates the subnormal current condition by functioning as an interrupter unit to produce an audible indicating sound through flexure of spring bias means 220.

Shunting resistor 206 connected in parallel with current sensor 205 is used to extend the current range of the monitor unit in a manner similar to an ammeter shunt. Furthermore, as in FIG. 1, indicator selector switch 223 is operative to provide only an audible indication when arm 215 thereof is in contact with terminal 216 and to provide a supplementary indication when arm 215 is in contact with terminal 217. Filament 219 may either be a substitute, secondary lamp filament or a warning light or both which indicate a primary lamp filament or a warning light or both which indicate a primary lamp failure by intermittently flashing on and off. Finally, resistor 218 is provided to ensure a sufficiently low resistance path to line 211 so that in the event other elements of the indicator circuit should fail, the shunting switch 208 still has a lower resistance path from terminal 213 to line 211.

Figure 3:
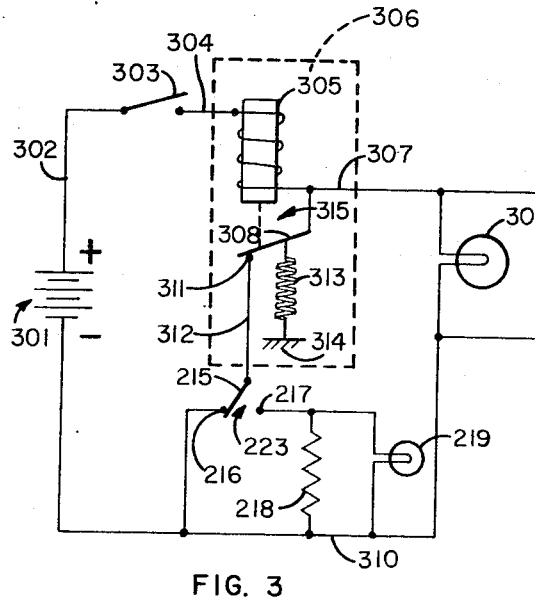
FIG. 3 is a circuit diagram of a second specific embodiment of monitoring unit which employs an electromagnetic current sensor element.

Referring now to FIG. 3, the second specific embodiment of monitoring unit embodying the features of FIG. 1 comprises a battery 301, one terminal of which is connected via a line 302 to one terminal of a power switch 303. The other terminal of power switch 303 is connected via a line 304 to one terminal of a current sensor 305 of a monitoring unit 306. The other terminal of current sensor 305 is connected to an arm 308 of a shunting switch 315 and via a line 307 to one terminal of one or more primary lamp filaments 309 which are to be monitored for operation. The other terminals of filaments 309 are connected via a line 310 to the other terminal of battery 301 to complete an electrical circuit. Shunting switch 315 includes a terminal 311 which is connected via a line 312 either directly to line 310 for return to battery 301 or to a selector switch 223 such as that of FIG. 2 so as to include a resistor 218 and a secondary filament or warning indicator 219.

Arm 308 of shunting switch 315 is electromagnetically actuated, as in a relay, by a current flowing through current sensor 305. A bias means 313 connected between arm 308 of switch 315 and a fixed support 314, urges arm 308 into the closed position in contact with terminal 311.

In operation, when power switch 303 is closed, current from battery 301 initially flows through lines 302, 304, 312 and 310, switch 303, current sensor 305 and arm 308 of switch 315 back to battery 301. This initial current, by passing through current sensor 305, actuates switch 308 to the open position in opposition to spring bias means 313. After shunting switch 308 has been actuated to the open position, a smaller, holding current flows through lines 302, 304, 307 and 310, switch 303, current sensor 305, and filaments 309 back to battery 301 to sustain shunting switch 308 in the open position. This holding current is determined by the normal current requirement of lamp filaments 309 when all filaments are operating, and bias means 313 is selected for a force which is slightly less than that required to close the open switch 308 when a normal holding current alone is flowing through current sensor 305. On the other hand, and in the event that one or more of the primary lamp filaments 309 should fail, the current of the load circuit is reduced by the amount of current formerly required by the failed lamp filament thereby decreasing the current flowing through sensor 305. As in FIGS. 1 and 2, arm 308 of switch 315 closes into contact with terminal 311. As soon as this occurs, shunting switch 315 is immediately actuated back to the open position due to current flow through arm 308 thereof. However, due to the subnormal current requirements of the load circuit, shunting switch 315 again returns to the closed position to continually repeat the opening and closing process in a periodic, rapidly recurring cycle typical of an interrupter device such as a buzzer, vibrator or horn.

During the rapid cyclic opening and closing of arm 308 of shunting switch 315, the potential of battery 301 is intermittently applied to indicator light 219 for only a portion of the periodic cycle, thereby resulting in an average potential for the period that is proportional to the percentage of the cycle time period that arm 308 of shunting switch 315 is in contact with switch terminal 311. For example, if arm 308 is in contact with terminal 311 for 70 percent of a cycle time period, the average potential applied to filament 219 will be 70 percent of the potential of battery 301. This average potential, which is less than the potential of battery 301, is then the effective potential utilized to illuminate filament 219. Therefore, upon a failure of one or more of primary lamp filaments 309, the present monitor unit may be utilized to indicate the degree of primary lamp filament failure. For example, the failure of only one primary lamp filament 309 will result in a certain frequency of cyclic operation, whereas the failure of an additional primary lamp filament 309 will result in a different frequency. This, in turn, affects the average effective potential applied to indicator lamp 219 so that it receives an increase in effective potential and becomes more brilliant as the number of failures of primary lamp filaments 309 increases. This increase in average, effective potential is not only due to the increased frequency of cyclic operation, but is also due to the increase of closed contact dwell time. In other words, in addition to the interrupting action of shunting switch 315 occurring at a faster cyclic frequency rate, arm 308 of shunting switch 315 is intermittently in closed contact with terminal 311 for a longer portion of the shorter cyclic time period.

In the same manner, the frequency of the audible sound produced by the cyclic opening and closing of arm 308 of shunting switch 315 will vary as a function of the degree of primary lamp filament failure. As a result, the frequency of the audible failure indication will increase as the number of failures of primary lamp filaments 309 increases. Furthermore, it should be noted that with a given degree of failure, there will be a slight change in the frequency of cyclic opening and closing of arm 308 as a function of time when the circuit begins operation as an active interrupter. This occurs when arm 308 is suddenly actuated from a passive state and gradually settles into a continuing active state. This characteristic is slightly irritating and, therefore, highly desirable in that it further helps in bringing and maintaining the attention of the driver to the failure.

Figure 4:
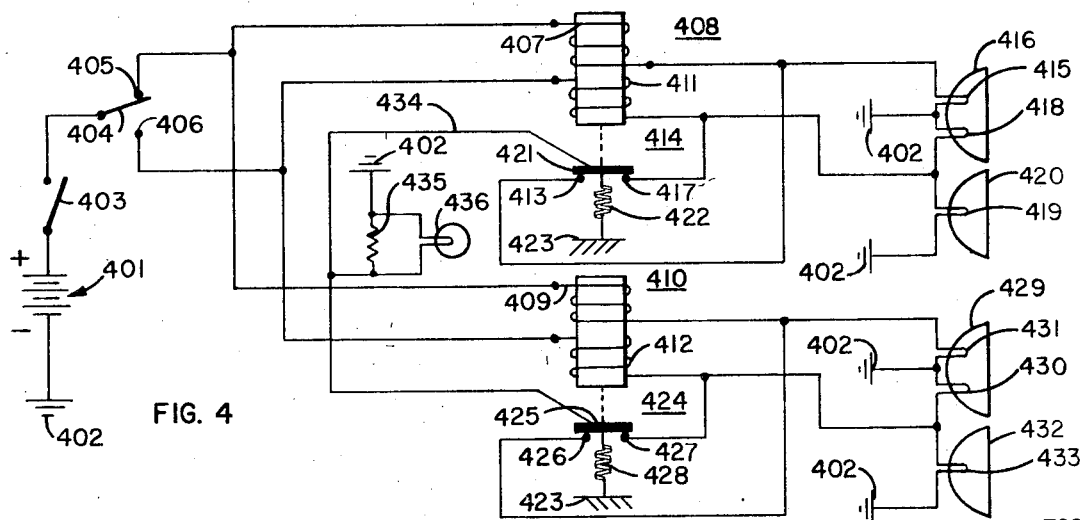
FIG. 4 is a circuit diagram of a third specific embodiment of monitoring unit illustrating the manner in which one or more electromagnetic-type monitoring units may be coordinated and adapted to monitor the operation, detect and indicate a failure, and to preferentially substitute an adjacent alternate filament, normally used for other purposes, for a failed filament of a conventional vehicle headlamp circuit.

Referring now to FIG. 4, the third specific embodiment of monitoring unit comprises a battery 401, one terminal of which is connected to a point of reference potential 402 which, for purposes of convenience, will be considered electrical ground, and the other terminal of which is connected to one terminal of a power switch 403. The other terminal of power switch 403 is connected to a headlamp beam selector switch 404 having a low-beam terminal 405 and a high-beam terminal 406. Low-beam terminal 405 is connected to one terminal of a low-beam current sensor coil 407 in a left monitor unit 408 and to one terminal of a low-beam current sensor coil 409 in a right monitor unit 410. Similarly, high-beam terminal 406 is connected to one terminal of a high-beam current sensor coil 411 in left monitor unit 408 and to one terminal of a high-beam current sensor coil 412 in right monitor unit 410.

The other terminal of current sensor coil 407 is connected to a first terminal 413 of a left monitor shunting switch 414 and to one terminal of a low-beam filament 415 in a left primary headlamp unit 416. The other terminal of filament 415 is connected to ground 402. The other terminal of coil 411 is connected to a second terminal 417 of left monitor shunting switch 414 and to one terminal of a pair of high-beam filaments 418 and 419 in left primary headlamp unit 416 and left auxiliary headlamp unit 420, respectively, the latter being included on those cars having two pairs of headlights. The other terminals of filaments 418 and 419 are connected to ground 402.

Left monitor shunting switch 414 has an arm 421 connected to one end of a spring bias means 422, the other end of which is anchored to a fixed support 423, whereby spring bias means 422 urges arm 421 into contact with terminals 413 and 417. On the other hand, a current flow in either low-beam current sensor coil 407 or high-beam current sensor coil 411 of sufficient magnitude causes arm 421 of shunting switch 414 to be drawn away from contacts 413 and 417 in opposition to the action of spring bias means 422. Coils 407 and 411 are preferably wound or connected in opposite directions so as to provide neutralizing, mutually opposing magnetic polarity fields in the presence of normal forward current flow through both coils and to provide additive fields in the presence of a forward flow through one coil and a reverse flow through the other, for reasons which will become clearer hereinafter.

Right monitor unit 410 is identical to left monitor unit 408 and includes a right monitor shunting switch 424 having an arm 425 and first and second terminals 426 and 427, a spring bias means 428 connected between arm 425 and fixed support 423, a right primary headlamp unit 429 having high- and low-beam filaments 430 and 431, respectively, and a right auxiliary headlamp unit 432, having a filament 433, each of the above elements being interconnected in the same manner as described previously for left monitor unit 408, left monitor shunting switch 414, and left headlamp units 416 and 420.

While not essential, it is preferable to interconnect arms 421 and 425 of shunting switches 414 and 424, respectively, by means of a line 434 which may also connect to one terminal of a resistor 435 and to one terminal of an auxiliary indicator lamp filament 436, the other terminals of resistor 435 and lamp filament 436 being connected to ground 402 for connection to battery 401.

Since left monitor unit 408 and right monitor unit 410 are identical and function in the same manner to monitor a corresponding headlamp unit, operation of one will suffice to describe the operation of the other. Accordingly only left monitor unit 408 will be described with the understanding that the remarks to follow are equally applicable to right monitor unit 410.

With beam selector switch 404 in contact with terminal 405, in the low-beam position, as shown, and with power switch 403 closed, a current flows through current sensor coil 407 of left monitor unit 408 and through filament 415 of left primary headlamp unit 416 back to battery 401. Since a normal headlamp filament such as filament 415 has an initial starting current which in much greater than the normal operating current, such starting current flowing through coil 407 actuates shunting switch 414 to move arm 421 away from terminals 413 and 417. As filament 415 becomes lit, the filament current decreases to a normal operating level. Spring bias means 422 is selected for a force which is slightly less than that required to close shunting switch 414 in the presence of such normal operating current. Therefore, under normal operating conditions, switch 414 remains open. If beam selector switch 404 is changed to the alternate, high-beam position in contact with terminal 406, the same operation repeats due to current passing through coil 411 and filaments 418 and 419. In the case of dual headlamps, the number of turns of winding 411 may be adjusted so that switch 414 is maintained open only when both filaments 418 and 419 are operating normally.

In the event that the selected beam circuit filament fails, such as filament 415 or filament 418 or 419, an audible indication of failure will be provided as described previously and, in addition, if capable of functioning, an adjacent, alternate beam filament is intermittently lit to signal an overcoming vehicle or pedestrian that a failure has occurred. More specifically, and by way of example, with beam selector switch 404 in the low-beam position as shown, and in the event of failure of filament 415, there will be insufficient current in the low-beam circuit to actuate switch 414. However, current will flow through coil 407 to terminal 413, through arm 421 to terminal 417 and then through filaments 418 and 419 back to battery 401. This high starting current through coil 407 serves to actuate shunting switch 414 to the open position. However, as soon as this occurs, the circuit through arm 421 to high-beam filaments 418 and 419 is interrupted, thereby terminating the flow of current through coil 407. When this occurs, shunting switch 414 again closes to reestablish the current through coil 417. The cycle then repeats in a continuous, periodic manner typical of an interrupter device such as a buzzer or horn. As before, the sound of arm 421 of shunting switch 414 repeatedly being actuated between the open and closed positions, provides an audible indication that the selected left low-beam filament 415 is inoperative. Furthermore, while shunting switch 414 is repeatedly opening and closing, the left high-beam filaments 418 and 419 are periodically being supplied with the potential of battery 403 for a portion of each cycle of switch 414, thereby lighting filaments 418 and 419 but with an average potential which is less than the full potential of battery 401. Since filaments 418 and 419 receive a less-then-normal potential, they are lit with a reduced intensity, with less brilliance, and with a smaller proportion of shorter wavelength colors than would occur with the full potential of battery 401. Thus, the light from filaments 418 and 419, when operated through the interrupting acting and intermittent connection of switch 414, appears as a yellowish-red color in contrast to the normal, full potential, white color. For example, an average potential of 15 percent of the lamp's normal potential produces a dull, red glow which changes to a greater intensity and to a more yellow color as the average potential of the lamp is increased.

High-beam filaments 418 and 419, in functioning as reserve or substitute filaments for the failed low-beam filament 415, thereby provide a visual indication to oncoming vehicles and pedestrians of the failure of low-beam filament 415. Thus, distant observers are signaled and may readily discern that the oncoming vehicle is indeed a two lamp vehicle and which lamp has failed.

With switch 404 in contact with terminal 406 in the high-beam position, operation is identical in the event of failure of filament 418 or filament 419. Furthermore, and as stated previously, right monitor unit 410 functions in an identical manner in the presence of failure of filament 430, 431 or 433.

In the event that both high-beam filament 418 and low-beam filament 415 are defective, as would occur if the glass envelope of headlamp unit 416 were broken, an alternate, substitute filament would not be available within the envelope but would, of course, be provided by auxiliary headlamp unit 420 in parallel with primary headlamp unit 416. Assuming, however, that auxiliary unit 420 is not employed, as in the case of older automotive vehicles, the failure of headlamp unit 416 requires other means for monitor unit 408 to function as an interrupter device. One such means is shown in FIG. 4 and comprises line 434 which connects arms 421 and 425 of switches 414 and 424, respectively, together and to battery 401 either directly or through a resistor 435 of sufficiently low value to actuate either switch 414 or 424 by the current passing through resistor 435 and either the high-beam current sensor coils or 411 or 412 or the low-beam current sensor coils 407 or 409. If a resistor such as resistor 435 is used in lieu of a direct connection to battery 401, an auxiliary failure indicating lamp 436 may also be employed to provide a local visual indication to the driver of filament failure in addition to the audible indication of one of the monitor units functioning as a buzzer or horn. However, even if line 434, resistor 435 and filament 436 are omitted, left and right monitor units 408 and 410, respectively, will still function. More specifically, and by way of example, with filaments 415, 418 and 419 all defective, with power switch 403 closed and with selector switch 404 in contact with terminal 405, left monitor shunting switch 414 will remain closed and switch 424 will be open due to normal current flow through coil 409 to filament 431 of right headlamp unit 429. Shunting switch 414 of left monitor unit 408 will be actuated by a current flowing through coil 407 to terminal 413, through arm 421 to terminal 417 and to coil 411. The current then flows in a direction reversed from normal, through coil 411 to coil 412 to right monitor unit 410 where the current flows through coil 412 in a normal forward direction to and through right high-beam filaments 403 and 433. This current, by flowing through coil 407 in the forward direction and through coil 411 in the reverse direction, thereby actuates left shunting switch 414 to the open position. However, as shunting switch 414 opens, the circuit to coil 412 of right monitor 410 is broken and shunting switch 414 closes to repeat the interrupting cycle whereby monitor unit 408 operates in the normal manner as an interrupter unit to signal failure of the left headlamp units.

With current sensor coils 407 and 411 wound or connected in the preferred manner, the reverse current in one coil aids the magnetic field produced by the forward current in the other coil, thereby producing a faster shunting switch action. Thus, the actuation of left monitor unit 408 predominates over right monitor unit 410 when left headlamp units 416 and 420 have a total failure. If current sensor coils 407 and 411 are not oppositely wound or connected, shunting switch 424 of right monitor unit 410 would also function as an interrupter due to the current flow through coil 412, resulting in the intermittent contact of shunting switch 424 decreasing the intensity of the fully operational right headlamp units 429 and 432.

Figure 5:
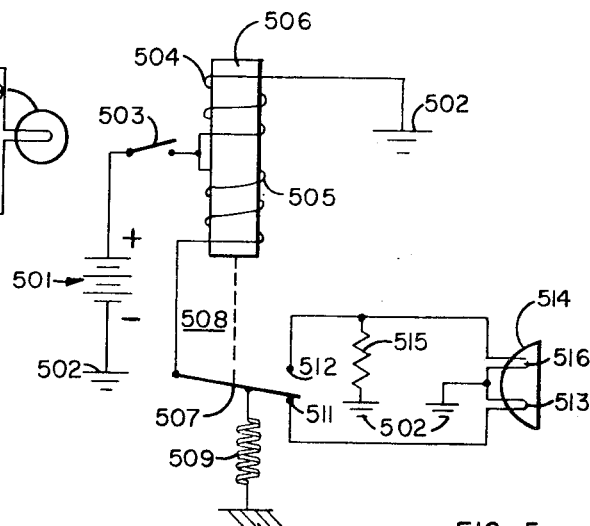
FIGS. 5 and 6 are circuit diagrams of fourth and fifth specific embodiments of monitoring units, respectively, and illustrating still other forms of electromagnetic current sensor elements wherein a wider range of abnormal conditions may be detected and indicated.

Referring now to FIG. 5, the fourth specific embodiment of monitoring unit which may be used in any of the circuits of FIGS. 1–4 comprises a battery 501, one terminal of which is connected to ground 502 and the other terminal of which is connected via a power switch 503 to one terminal of a voltage sensing coil 504 and to one terminal of a current sensing coil 505, both coils being wound on a common core 506. The other terminal of voltage sensing coil 504 is connected to ground 502 for return to battery 501. The other terminal of current sensing coil 505 is connected to an arm 507 of a switch 508 which is electromagnetically actuated by a current in either of coils 504 or 505. A spring bias means 509 connected between arm 507 of switch 508 and a fixed support 510 urges arm 507 into contact with a first switch terminal 511 away from a second switch terminal 512. Terminal 511 is connected to one terminal of a primary lamp filament 513 in a headlamp unit 514, the other terminal of which is connected to ground 502. Terminal 512 is connected via a resistor 515 to ground 502 and to one terminal of a secondary lamp filament 516 in headlamp unit 514, the other terminal of which is connected to ground 502. Although filaments 513 and 516 are shown as being within a single envelope 514, it is obvious that they may be in separate envelopes.

In operation, with power switch 503 closed, the potential of battery 501 is applied to coil 504 which induces a magnetic bias field of constant force and polarity. Concurrently, the current flowing through differentially wound coil 505, arm 507 of switch 508, terminal 511 and through filament 513, induces a magnetic field of comparable force but of opposite magnetic polarity to the field induced by coil 54. As a result, the fields created by coils 504 and 505 counterbalance and largely nullify each other under normal operating conditions with primary filament 513 functioning properly. Therefore, spring bias means 509 maintains arm 507 of switch 508 in contact with terminal 511 to continue operation of filament 513.

In the event of a failure of primary lamp filament 513, as might occur with an open or shorted filament or connecting circuit, the magnetic field generated by coil 505 is either decreased in the case of an open or high resistance connection, or increased by a short circuit bypassing filament 513. Either condition unbalances the normally counterbalanced magnetic fields created by coils 504 and 505. As a result one of the magnetic fields will predominate and actuate switch 508 causing arm 507 to move from terminal 511 to terminal 512, in opposition to spring bias means 509. With arm 507 in contact with terminal 512, secondary lamp filament 516 and resistor 515, if used, provide a path for current flow through current sensing coil 505, arm 507, terminal 512 and filament 516 in parallel with resistor 515. This current, in passing through coil 505, generates a magnetic field to counterbalance the field of coil 504 whereupon spring bias means 509 reactuates arm 507 from terminal 512 to terminal 511. However, because of the abnormal condition of primary lamp filament 513, arm 507 is again driven towards terminal 512 and the cycle repeats to provide an intermittent, continually recurring, periodic cycle typical of an interrupter device, thereby providing an audible indication of the abnormal primary lamp filament 513. In addition, secondary lamp filament 516, being intermittently connected, provides a visual indication which may be used to signal distant observers. Resistor 515 is not essential, but may be included as a safety measure to ensure the operation of switch 508 in the event that secondary lamp filament 516 should also fail.

Figure 6:
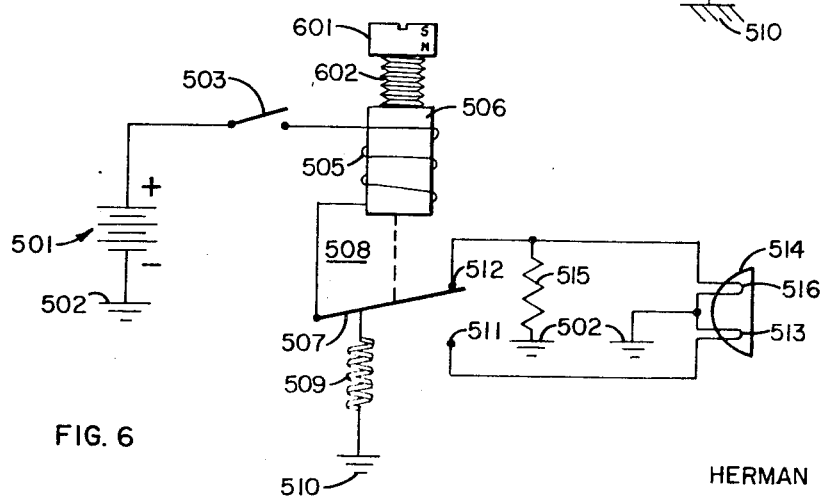

Referring now to FIG. 6, the fifth specific embodiment of monitoring unit is in all material respects identical to the embodiment of FIG. 5 with the exception that voltage sensing coil 504 is replaced by a magnetic bias means such as a permanent magnet 601 which may be adjustably positioned as by threaded means 602 relative to core 506. As was the case in the embodiment of FIG. 5, magnetic bias means 601 provides a magnetic field which is induced into and conducted through core 506 towards switch 508 so as to provide a magnetic field which is sufficient to overpower spring bias means 509 and to urge arm 507 of switch 508 into contact with terminal 512. On the other hand, current sensing coil 505, under normal operating conditions, creates an equal and opposite counteracting magnetic field so that the total magnetic field on switch 508 under normal operating conditions is insufficient to overcome the force of bias means 509. However, in the presence of a failure of primary lamp filament 513, switch 508 operates as an interrupter to provide an audible and visual indication of the failure.

Figure 7:
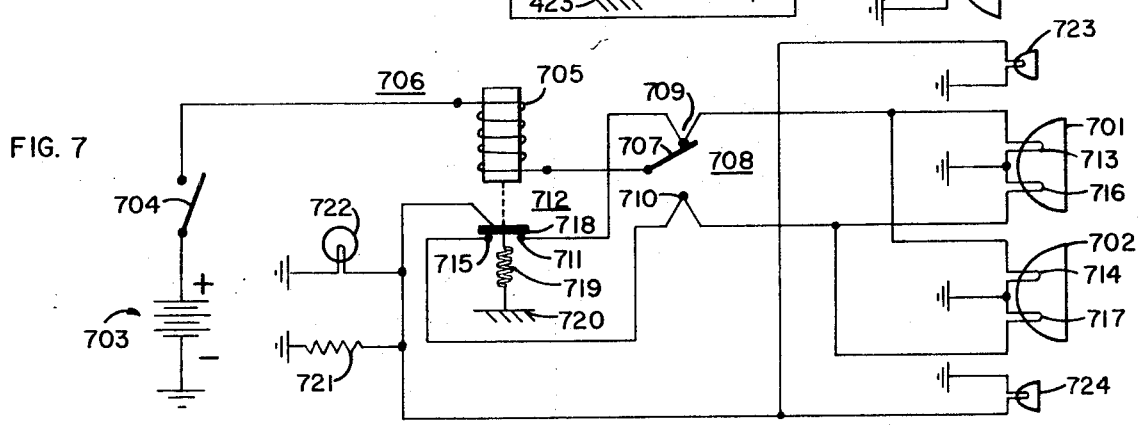
FIGS. 7, 8 and 9 are sixth, seventh and eighth specific embodiments of monitoring units, respectively, and illustrating the manner in which single monitor units of the electrothermal or electromagnetic types may be connected to monitor an entire vehicle headlamp system. DESCRIPTION OF THE PREFERRED EMBODIMENTS Referring now to the drawings and, more particularly, to FIG. 1 thereof, a circuit element failure indicator constructed in accordance with the teachings of the present invention may be represented in block diagram form by an electrical power source 101, one terminal of which is connected via a line 102 to one terminal of a power switch 103. The other terminal of power switch 103 is connected via a line 104 to one terminal of a current sensor 105. The other terminal of current sensor 105 is connected via a line 106 to one terminal of a load circuit 107, the other terminal of which is connected via a line 108 to the other terminal of power source 101. Current sensor 105 provides an actuating signal over a line 109 to a switch 110, one terminal of which is connected to line 106 and the other terminal of which is connected to a line 111 which is connected to the arm 112 of a switch 113. Arm 112 is adapted to be manually positioned in contact with one of terminals 114 or 115, terminal 114 being connected directly to line 108 and terminal 115 being connected to line 108 via a supplemental visual indicator 116.

Referring now to FIG. 7, the sixth specific embodiment of monitoring unit, in which a single monitor unit monitors the operation of both a left headlamp unit 701 and a right headlamp unit 702 and provides both an audible indication in the presence of failure of either and a visual indication to distant observers, comprises a battery 703 one terminal of which is grounded and the other terminal of which is connected via a power switch 704 to one terminal of a current sensor coil 705 of a monitor unit 706. The other terminal of current sensor coil 705 is connected to an arm 707 of a headlamp beam selector switch 708 having a high-beam terminal 709 and a low-beam terminal 710. Terminal 709 is connected to a first terminal 711 of an interrupter switch 712 and to one terminal of high-beam filaments 713 and 714 in left and right headlamp units 701 and 702, respectively, the other terminals of which are grounded. Similarly, terminal 710 is connected to a second terminal 715 of switch 712 and to one terminal of loW-beam filaments 716 and 717 in left and right headlamp units 701 and 702, respectively, the other terminals of which are grounded. Switch 712 further includes an arm 718 connected to one end of a spring bias means 719, the other end of which is anchored to a fixed support 720, spring bias means 719 urging arm 718 of switch 712 into contact with terminals 711 and 715. In addition, switch 712 is electromagnetically coupled to coil 705 which generates, under normal operating conditions, a magnetic field which urges arm 718 out of contact with terminals 711 and 715 in opposition to bias means 719. An auxiliary indicator circuit, comprising a resistor 721, a dashboard auxiliary indicator lamp 722, and left and right auxiliary lamps 723 and 724 may be connected in parallel between arm 718 of switch 712 and ground.

In operation, monitor unit 706 monitors the operation of the selected headlamp beam circuit, as determined by the position of beam selector switch 708, so that in the presence of a normal operating current, coil 705 urges arm 718 of switch 712 out of contact with terminals 711 and 715. Upon failure, such as an open filament occurring in the selected circuit, the reduced current is sensed by coil 705 in combination with switch 712 and bias means 719 whereby switch 712 operates as an interrupter unit in the same manner as described previously and the alternate circuit is utilized as a supplementary circuit through switch 712 intermittently shunting the selected and alternate beam circuits in a recurring periodic cycle. Switch 718, through the intermittent shunting action, periodically connects the alternate beam circuits for only a portion of each cycle to the potential of battery 703, whereupon the alternate beam circuit filaments supplement the selected beam filaments with a characteristic red or amber color. As a result, the defective headlamp unit having the failed selected filament has the alternate nonselected filament lighted, at a lesser intensity, while the other, good headlamp unit, has both the selected filament lighted at normal intensity and the nonselected filament lighted at a reduced intensity. In the good headlamp, the addition of the lighted alternate filament at the reduced intensity contributes little change to the visual appearance, while the defective headlamp unit is now clearly visible and identified as the defective headlamp unit by the amber case of the light in contrast to the near white light of the good headlamp unit. The left and right auxiliary indicator lights 723 and 724, if used, further designate the left and right sides of the vehicle and would be of greatest use in the event that both filaments of a headlamp unit were defective, as might occur if the envelope of the unit were broken. The driver receives the usual audible indication of headlamp failure by the vibratory action of switch 712, as well as a visual indication provided by lamp 722, if used.

Figure 8:
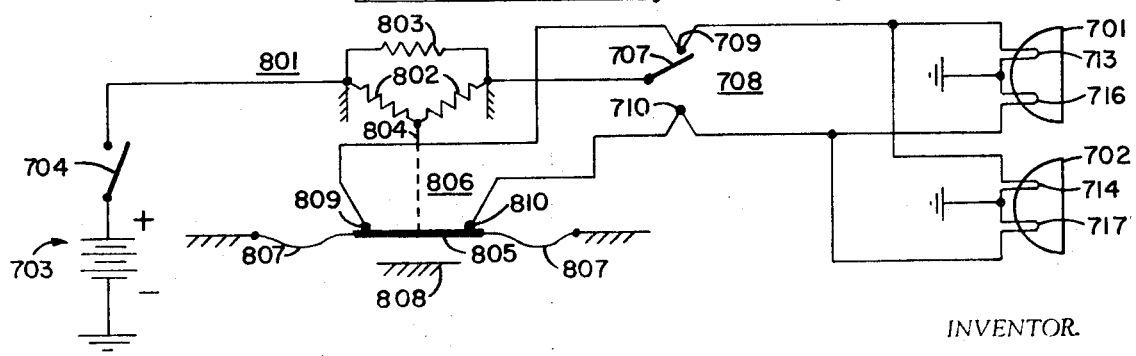

Referring now to FIG. 8, the seventh specific embodiment is in all respects similar to the embodiment of FIG. 7 except that monitor unit 706 is replaced with a monitor unit 801 which comprises a current sensing resistor 802 connected between power switch 704 and arm 707 of beam selector switch 708. A current sensing resistor shunt 803 may be connected in parallel with current sensing resistor 802, if desired, to extend the current range of monitor unit 801 or to more easily adapt monitor unit 801 to a variety of circuits having different normal current levels. Current sensing resistor 802 expands by thermal action to increase the length thereof when a current flows therethrough. The increased length permits the central portion of resistor 802 to be displaced further from a centerline between the two anchored ends thereof and the displacement is mechanically transmitted by a coupling means 804 to an armature 805 of an interrupting switch 806. Armature 805 may be attached to a larger area plate such as a sounding board or diaphragm 807 which may be formed of an electrically conducting material and which may also provide a spring bias acting to urge armature 805 of switch 806 against a diaphragm stop 808, which may include a permanent magnet, if desired, operating in opposition to the tension of current sensing resistor 802 to more strongly urge armature 805 into contact with a pair of terminals 809 and 810 of switch 806 when resistor 802 is cold. As in FIG. 7, armature 805 of switch 806, when closed in contact with terminals 809 and 810, shunts terminals 709 and 710 of beam selector switch 708. A dashboard indicator lamp and left and right auxiliary lamps may also be provided as in FIG. 7.

As should be obvious, when current sensing resistor 802 is energized by a normal current, the thermal expansion thereof opens interrupter switch 806 thereby interrupting the shunt connection between terminals 709 and 710 and all other supplemental indicating lights. On the other hand, in the presence of a failure of a selected filament, the current through current sensing coil 802 will decrease thereby permitting closure of armature 805 of switch 806 into contact with terminals 809 and 810, initiating interrupter action and a supplemental visual indication via the nonselected filament.

Figure 9:
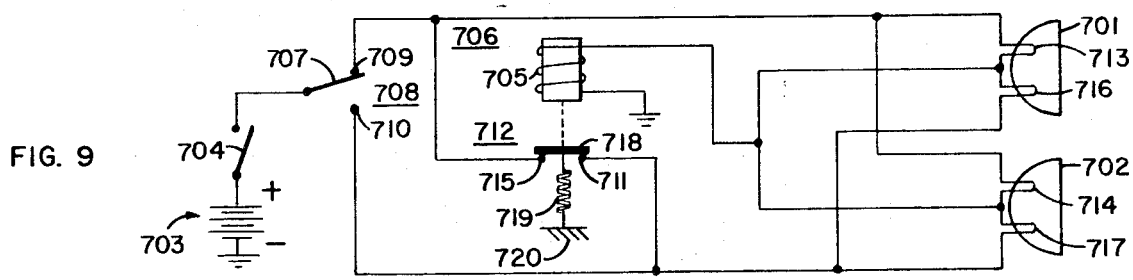

Referring now to FIG. 9, the eighth specific embodiment of the present invention is in all material respects identical in structure and operation to the embodiment of FIG. 7 except that coil 705 of monitor 706 is connected between filaments 713, 714, 716 and 717 and ground rather than connecting coil 705 between the filaments and the positive side of battery 703 as in FIG. 7. However, this difference does not change the basic operation of the circuit in that in the presence of a normal current through the selected filament, current sensing coil 705 urges arm 718 of switch 712 out of contact with terminals 711 and 715. In the event of failure of one of the selected filaments armature 718 periodically opens and closes in a manner typical of an interrupter unit to provide an audible indication of failure and to interconnect the nonselected filaments to provide a visual indication to distant observers. The primary advantage of the configuration of FIG. 9 over the configuration of FIG. 7 is that placing the monitor sensing element 705 in the ground leg of the circuit is more easily accomplished in a larger variety of automotive vehicles making the configuration of FIG. 9 more universal. However, with respect to performance and operation, the circuits of FIGS. 7 and 9 are identical.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In a system including first and second critical electrical circuit elements, a power supply, and first switch means for selectively connecting either of said first and second critical electrical circuit elements to said power supply, the improvement comprising:

means for monitoring the operation of said critical electrical circuit elements and for intermittently substituting the nonselected circuit element for the selected circuit element in the event of a failure of the latter, said means comprising:

an interrupter device connected in circuit with said critical electrical circuit elements and said power supply and said first switch means for monitoring the current from said power supply to either selected circuit element, said interrupter device being inhibited from functioning as an active interrupter by a normal current to said selected circuit element, said interrupter device being enabled to function as an active interrupter to produce an audible indication and to simultaneously and intermittently connect the nonselected circuit element to said power supply in the presence of a subnormal current to said selected circuit element, said interrupter device comprising:

second switch means having an open circuit position and a closed circuit position connected between said first and second circuit elements;

bias means operatively associated with said second switch means for biasing said second switch means in said closed position thereby connecting said nonselected circuit element to said power supply with said selected circuit element; and a single current sensing coil connected in circuit with said power supply and said first switch means for sensing the current flowing from said power supply to said first switch means and thence to either of said critical electrical circuit elements, said current sensing coil electromagnetically actuating said second switch means to said open position to disconnect said nonselected circuit element from said power supply when said current is above a predetermined value, said second switch means returning to said closed position to connect said nonselected circuit element to said power supply when said current through said selected circuit element is below said predetermined value, the current flowing from said power supply through said nonselected circuit element again actuating said second switch means to said open position until said second switch means again opens so that said second switch means vibrates producing an audible indication and simultaneously and intermittently substitutes said nonselected circuit element for said selected circuit element.

2. In a system according to claim 1, the improvement further comprising:

means connecting said second switch means to said power supply whereby said second switch means operates as an interrupter device in the presence of a failure of both of said first and second critical electrical circuit elements.

* * * * *